R. LIEBAU.
HYDROPNEUMATIC DEVICE.
APPLICATION FILED MAY 13, 1914. RENEWED FEB. 12, 1916.
1,198,643.
Patented Sept. 19, 1916.
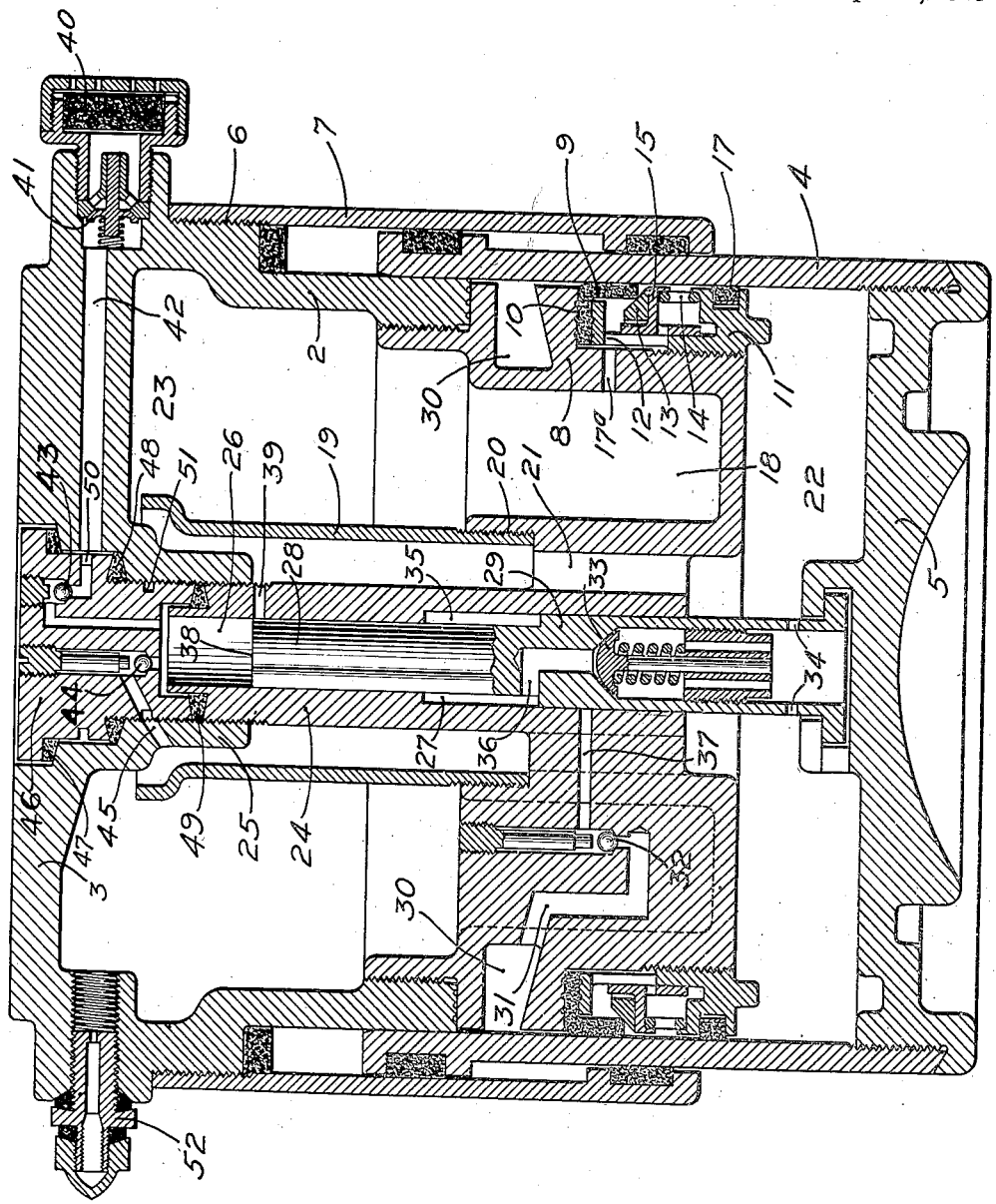
WITNESSES:
INVENTOR.
Richard Liebau
BY
HIS ATTORNEY IN FACT

UNITED STATES PATENT OFFICE.

RICHARD LIEBAU, OF NEW HAVEN, CONNECTICUT, ASSIGNOR TO THE WESTINGHOUSE AIR SPRING COMPANY, A CORPORATION OF PENNSYLVANIA.

HYDROPNEUMATIC DEVICE.

1,198,643.     Specification of Letters Patent.    Patented Sept. 19, 1916.

Application filed May 13, 1914, Serial No. 838,299. Renewed February 12, 1916. Serial No. 78,083.

*To all whom it may concern:*

Be it known that I, RICHARD LIEBAU, a citizen of the United States, and a resident of New Haven, in the county of New Haven and State of Connecticut, have made a new and useful Invention in Hydropneumatic Devices, of which the following is a specification.

This invention relates to hydropneumatic devices of the type set forth in several applications for patent filed by me and in Letters Patent No. 1,036,043 issued to George Westinghouse on August 20, 1912.

In the present case, as in the former cases, the invention is embodied in a fluid-compression device adapted for use as a compression spring broadly applicable in any relation where two bodies are so associated that resilient support is desirable, and the general object in view in this, as well as in the former cases, has been to embody the principle of resilient support by an elastic compression medium such as air or gas in a commercially practical, self-contained air-tight compression device adapted to serve all the purposes and functions of a spring.

My present invention also resembles that of the said former applications and patent in so far as a fluid-tight joint between the sliding surfaces is maintained by means of a liquid bath.

According to the present invention, which is particularly applicable for use as a spring for railroad cars, and other vehicles subject to approximately constant loads (and which hereinafter without any idea of limiting the invention will be referred to as an air spring), means are provided for forcing air into the compression chamber of the spring, for automatically determining the normal or operative relative positions of the relatively movable members of the spring irrespective of the load carried thereby, and for transferring the sealing liquid from the low pressure side of the sliding joint to the high pressure side.

The drawing is a sectional elevation of an air spring embodying this invention.

In the device, the cushion or compression chamber is made up of a cylinder 2 provided with a head 3 formed integrally therewith and which telescopes within a cylinder 4 having a bottom 5. Secured to head 3 at 6 is an outer cylinder 7 which acts as a cover or mud or dust guard. Threaded to the lower end of cylinder 2 is a plunger head 8 which carries a cup leather packing 9 for the telescoping or sliding joint between the cylinders 2 and 4. A seat 10 is formed for the cup leather packing and the packing is firmly held to said seat by means of a nut 11 threaded to the lower end of the plunger head and which is provided with an upright extension 12 which clamps the cup leather to its seat 10. A cone expander ring 13 is pressed against the inner depending lip of the cup leather packing by means of a spring 14 which presses against an intermediate sliding and centering member 15 interposed between the cone expander ring and the spring. This member 15 slides on the extension of the nut 11 and allows the expander ring to movably center on the depending lip of the cup leather packing.

A spring-backed leather wiper ring 17 bears against the inner surface of cylinder 4 and serves to retain oil or other sealing liquid in the chamber which contains the cup leather packing.

The depending flange of the cup leather packing bears against the inner surface of cylinder 4 and the chamber containing the packing is in open communication by means of a duct 17ª with an annular reservoir 18 formed in the plunger head. The plunger head also carries a tubular member 19 threaded thereinto at 20, and which, with cylinder 2, forms an enlargement of the reservoir 18. The plunger head is drilled through from top to bottom in a number of places as shown at 21 so as to place the chamber 22 below the plunger head and the chamber 23 above the oil level in the reservoir in open communication, one with the other, and these passages serve as transfer passages for the air during the compression and extension movements of the air spring.

At its center, the plunger head is provided with a tubular extension 24 which is threaded into a depending central boss 25 of head 3 and which serves as a pump cylinder. This pump cylinder is bored out so as to provide plunger chambers 26 and 27 of different diameters.

A pump plunger having two diameters 28 and 29 snugly fits within the bores of the pump cylinder 24 and the portion of larger diameter acts as the plunger of an oil pump for transferring oil from the low pressure side of the cup leather packing to the high pressure side, while the portion of the plunger of smaller diameter acts as the plunger of an air pump for drawing air from the atmosphere and forcing it into the compression chamber of the spring.

The plunger head on the low pressure side of the cup leather packing is provided with an annular collecting chamber 30 for the oil which passes the cup leather packing, and, the oil from this chamber flows through passage 31 to the inlet to the oil pump. A ball check valve 32 is provided in the passage 31. The oil pump plunger 29 carries within itself a non-return valve 33 and the outlet 34 of the oil pump is so positioned that it discharges the oil taken from collecting chamber 30 to the chamber 22. The contour of the lower face of the plunger head is such with relation to the contour of the inner face of bottom 5 that the oil collected in chamber 22 upon excessive compression movements of the air spring will be forced through transfer passage 21 and over into reservoir 18.

Upon the extension movements of the air spring a partial vacuum will be created in the space 35 of the oil pump and when the port 36 passes down below inlet channel 37, the oil will be drawn from collecting chamber 30 and upon the compression movements of the air spring will be forced down through check valve 33 and out into chamber 22 through the oil pump outlet 34.

During the compression and extension movements of the spring so long as the top 38 of the air pump plunger does not pass below regulating port 39 in the pump cylinder the air pump will be effective for drawing in air through strainer 40, check valve 41, passage 42 and check valve 43 and will discharge the same through check valve 44 and passage 45 to the compression chamber 23 of the air spring.

During the compression and extension movements of the air spring when the top 38 of the air pump plunger operates below regulating port 39, the air pump is rendered ineffective by means of the port 39 and air will merely be drawn in through this port from the compression chamber of the air spring and forced out into it.

Threaded within the central depending boss 25 of head 3 is a plug, 46. This plug is concentric with tubular extension 24 of the plunger head and is packed against leakage by means of soft packings 47, 48 and 49. The outer cylindrical surface of the plug is provided with an annular groove, 50, which registers with air channel 42 and an annular groove 51 which registers with air channel 45.

A filling plug 52 is threaded into the side of head 3 and is adapted to be provided with an air valve, such as an ordinary tire valve, whereby the requisite amount of air may be pumped into the compression chamber of the spring before starting. The sealing oil may be introduced into the reservoir 18, through charging plug 52.

In accordance with the provisions of the patent statutes, I have described the principle of operation of my invention together with the device which I now consider to represent the best embodiment thereof, but I desire to have it understood that the device shown is only illustrative and that the invention can be carried out in other ways.

What I claim is:

1. A cushion device comprising relatively movable members forming a chamber and having a sliding joint therebetween to permit variation of the volumetric capacity thereof, liquid and gaseous fluids within said chamber arranged so that the only fluid which can escape through said joint will be essentially liquid, means for automatically returning the escaped liquid to said chamber, and means within said chamber for forcing air thereinto.

2. A cushion device comprising relatively movable members forming a chamber and having a sliding joint therebetween to permit variation of the volumetric capacity thereof, liquid and gaseous fluids within said chamber arranged so that the only fluid which can escape through said joint will be essentially liquid, means for automatically returning the escaped liquid to said chamber, means within said chamber for forcing air thereinto, and means for automatically determining the normal or operative relative positions of said relatively movable members irrespective of the load carried by the device.

3. In a telescopic air spring having a sliding joint adapted to be sealed with liquid, a pump for transferring liquid from the low pressure side of said joint to the high pressure side of said joint and a valved air pump within the device for forcing air into said spring.

4. In a telescopic air spring having a sliding joint adapted to be sealed with liquid, a pump for transferring liquid from the low pressure to the high pressure side of said joint, a pump for forcing air into said device, and means for rendering said air pump ineffective; the operation of said means being independent of the load carried by the spring.

5. In a telescopic air spring having a sliding joint adapted to be sealed with liquid, a pump within the spring for transferring liquid from the low to the high pressure side of said joint, an air pump within said spring for forcing air thereinto, and means independent of the load on the spring for automatically determining its normal or operative extended position.

6. A cushion device comprising relatively movable members forming a chamber and having a sliding joint therebetween adapted to be sealed with liquid, a pump for transferring liquid from the low to the high pressure side of said joint, an air pump for forcing air into said chamber and means independent of the load carried by the spring for rendering the said air pump at times inoperative.

7. In a telescopic air spring having a sliding joint adapted to be sealed with liquid, an oil collecting chamber on the low pressure side of said sliding joint, axially alined air and oil pumps within said device, means connecting the air pump inlet with the atmosphere, and means connecting the oil pump inlet to said collecting chamber.

8. In a telescopic air spring having a sliding joint adapted to be sealed with liquid, a collecting chamber on the low pressure side of said joint, positively operated air and oil pumps within said device, means connecting the air pump inlet with the atmosphere, and means connecting the oil pump inlet to said collecting chamber.

9. In a telescopic air spring having a sliding joint adapted to be sealed with liquid, an oil collecting chamber communicating with said joint, air and oil pumps within said device, means connecting the air pump inlet with the atmosphere, and means connecting the oil pump inlet to said collecting chamber.

10. In a telescopic air spring having a sliding joint adapted to be sealed with liquid, an oil collecting chamber communicating with said joint, axially alined air and oil pumps within said device, valved means connecting the air pump inlet with the atmosphere, and valved means connecting the oil pump inlet to said collecting chamber.

11. In a telescopic air spring having a sliding joint adapted to be sealed with liquid, an oil collecting chamber in communication with said joint, air and oil pumps within said device, valved means connecting the air pump inlet with the atmosphere, valved means connecting the oil pump inlet to said collecting chamber, and means for rendering said air pump ineffective, the operation of said means being independent of the load carried by the spring.

12. A cushion device comprising relatively movable members forming a chamber and having a sliding joint therebetween adapted to be sealed with liquid, a collecting chamber communicating with said joint, axially alined air and oil pumps located centrally within said chamber, valved means connecting the air pump inlet with the atmosphere, valved means connecting the oil pump inlet to said collecting chamber, and means independent of the load carried by the spring for rendering the air pump at times inoperative.

13. A cushion device comprising relatively movable members forming a chamber and having a sliding joint therebetween, a cupped leather packing for said joint, an oil collecting chamber on the low pressure side of said packing and in communication with said joint, positively operated, axially alined air and oil pumps located centrally with in said chamber valved means connecting the air pump inlet with the atmosphere, valved means connecting the oil pump inlet with said collecting chamber, and means independent of the load on the spring for automatically determining its normal or operative extended position.

14. A cushion device comprising relatively movable members forming a chamber and having a sliding joint therebetween to permit variation of the volumetric capacity thereof, axially alined air and oil pumps located centrally within said chamber and comprising a cylinder having two internal diameters carried by one of said movable members, and a plunger having two external diameters and located within said cylinder and carried by the other movable member, valved inlet and discharge passages for said pumps, and means for automatically determining the normal or operative relative position of said relatively movable members irrespective of the load carried by the device.

15. A telescopic air spring comprising telescopic members, inclosing a chamber of variable volumetric capacity and having a sliding joint therebetween adapted to be sealed with liquid, means located within said chamber for transferring liquid from the low pressure to the high pressure side of said joint and for forcing air into the chamber, and means for automatically determining the normal or operative relative position of said members irrespective of the load carried by the air spring.

16. A telescopic air spring comprising telescopic members inclosing a chamber of variable volumetric capacity and having a sliding joint therebetween adapted to be sealed with liquid, means located within said chamber for transferring liquid from the low pressure to the high pressure side of said joint and for forcing air into the chamber, and means the operation of which is independent of the load carried by the spring for controlling the delivery of air to said chamber.

In testimony whereof, I have hereunto subscribed my name this 8th day of May, 1914.

RICHARD LIEBAU.

Witnesses:
GRACE E. FISHER,
ARTHUR H. KINNEY.